United States Patent [19]
Whisnant

[11] Patent Number: 5,153,993
[45] Date of Patent: Oct. 13, 1992

[54] CLAY CUTTER

[76] Inventor: Jack S. Whisnant, Rte. 2, Box 197, Kershaw, S.C. 29067

[21] Appl. No.: 762,564

[22] Filed: Sep. 12, 1991

[51] Int. Cl.$^5$ .................. A21C 5/00; A21C 5/02; B26D 1/48; B26D 1/44
[52] U.S. Cl. ......................... 30/117; 30/116; 83/200.1; 83/651.1
[58] Field of Search ............ 30/114, 115, 116, 117, 30/299; 83/651, 651.1, 654, 200.1

[56] References Cited

U.S. PATENT DOCUMENTS

| | | | |
|---|---|---|---|
| 1,685,533 | 9/1928 | Donnellan | 30/116 |
| 1,695,761 | 12/1928 | Hecker | 30/117 |
| 2,023,345 | 12/1935 | Storer et al. | 30/116 |
| 2,405,311 | 8/1946 | Livadas | 30/117 |
| 3,509,628 | 5/1970 | Carturan | 83/200.1 |
| 3,578,048 | 5/1971 | Von Duyke | 83/651.1 |
| 4,213,241 | 7/1980 | Haapala | 30/115 |

Primary Examiner—Douglas D. Watts
Assistant Examiner—Paul M. Heyrana, Sr.
Attorney, Agent, or Firm—W. Thad Adams, III

[57] ABSTRACT

A clay cutter for simultaneously cutting a plurality of slabs of clay, including a frame including first and second opposing, longitudinally-extending side members. A plurality of cross wires are attached to and extend between the first and second side members in mutual parallel relation to each other. First and second springs extend along respective ones of the side members and are alternately retractable and uniformly extensible between a relatively short length and a relatively long length. The cross wires are attached by opposite ends to the springs and are moveable with the springs as the springs move between the relatively short length and the relatively long length to thereby decrease or increase uniformly the space between each of the cross wires.

9 Claims, 4 Drawing Sheets

CLAY CUTTER

TECHNICAL FILED AND BACKGROUND OF THE INVENTION

This invention relates to a clay cutter. The clay cutter is used by a potter to cut a relatively large slab or block of green clay into smaller pieces of a uniform size and weight.

A potter, particularly a "production potter", often desires to make several replications of the same piece of pottery; for example, a flower pot, mug, plate, bowl or the like. Making such replications can be accomplished easier and faster if the potter starts with the same amount of clay for each of the pieces.

The starting ball of clay can be weighed to obtain the same size, but this requires time and effort. If the ball of clay is too heavy a piece can be pinched off of the ball to reduce its weight, until the desired weight is obtained. However, correcting an underweight ball of clay can create serious problems. Adding a pinch of clay back onto the ball risks introducing an air bubble into the ball. If the bubble remains, the trapped air can cause cratering of the surface or even fragmenting of the piece during firing.

One way to reduce this risk is to "wedge" the clay. Wedging is similar to kneading bread but without folding. The clay is "smeared" so that any air bubbles are wiped out. Wedging also serves to homogenize the clay with respect to moisture and composition. Hand wedging is time-consuming, takes away from production time and is hard on the potter's wrists.

Another way to homogenize and remove air from green clay is to process the clay in a pug mill. From a pug mill extrusion of uniform cross-section, equally weighted slabs of clay can be obtained by cutting off the same length of clay with each cut.

Several cuts can be made at the same time by using a frame having several wires strung between opposite sides. Some potters will have a small collection of such frames each with different spacing between wires. Slight adjustments in the amount of clay required to make a different piece, or changing from one pug mill die to another requires restringing an existing frame or making another frame with a different wire spacing.

Insofar as is known, a clay cutter with an easily adjustable wire spacing has not been heretofore developed, and is the subject of this invention.

SUMMARY OF THE INVENTION

Therefore, it is an object of the invention to provide a clay cutter which can cut several uniformly-sized slabs of clay with one pass through a large piece of clay.

It is another object of the invention to provide a clay cutter which is adjustable so that proportionally increased or decreased slabs can be cut simultaneously.

It is another object of the invention to provide a clay cutter which permits simultaneous adjustment of the spacing between a plurality of clay cutting wires.

It is another object of the invention to provide a clay cutter which permits simultaneous adjustment of the spacing between a plurality of clay cutting wires with a single winding motion.

These and other objects of the present invention are achieved in the preferred embodiments disclosed below by providing a clay cutter for simultaneously cutting a plurality of slabs of clay, comprising a frame means including first and second opposing, longitudinally-extending side members, first and second extension means located within respective side members, and a plurality of mutually parallel cross wires attached by opposite ends to the extension means. The extension means are alternately retractable and uniformly extensible rate between a relatively short length and a relatively long length. Since cross wires are attached by opposite ends to the extension means, and are moveable with the extension means, the same relative spacing between the cross wires is maintained as the extension means are moved. This arrangement thereby permits a plurality of equal slabs of clay to be cut during a single pass of the cross wires through a large mass of clay.

Preferably, locking means are provided for locking the extension means and the cross wires in a fixed position.

According to one preferred embodiment of the invention, the first and second extension means each comprise an elongate coil spring.

According to another preferred embodiment of the invention, the cross wires have integrally-formed hooks on opposing ends for hooking over a predetermined coil of the coil spring.

According to yet another preferred embodiment of the invention, strand means are attached to the first and second extension means for extending the coil springs against the bias of the springs.

According to one preferred embodiment of the invention, winding means are provided for winding the strand means onto and off thereof as the coil spring is alternately extended and retracted.

Preferably, the strand means comprises a ball chain.

According to one preferred embodiment of the invention, the side members are tubular and include inwardly-facing elongate slots in respective side walls of the side members. The coil springs are positioned for retraction and extension in the respective tubes, and opposing ends of the cross wires extend through the slots into attachment with the coil springs.

According to another preferred embodiment of the invention, the winding means comprises a single rotatable shaft, and the strand means comprise first and second strands, each attached by one end thereof to one end of respective ones of the first and second coil springs.

Preferably, the other end of each of the strands is attached to the shaft for simultaneous winding onto and off of the shaft as the coil spring is alternately extended and retracted.

BRIEF DESCRIPTION OF THE DRAWINGS

Some of the objects of the invention have been set forth above. Other objects and advantages of the invention will appear as the invention proceeds when taken in conjunction with the following drawings, in which.

DESCRIPTION OF THE PREFERRED EMBODIMENT AND BEST MODE

Construction of Clay Cutter

Figure 1:
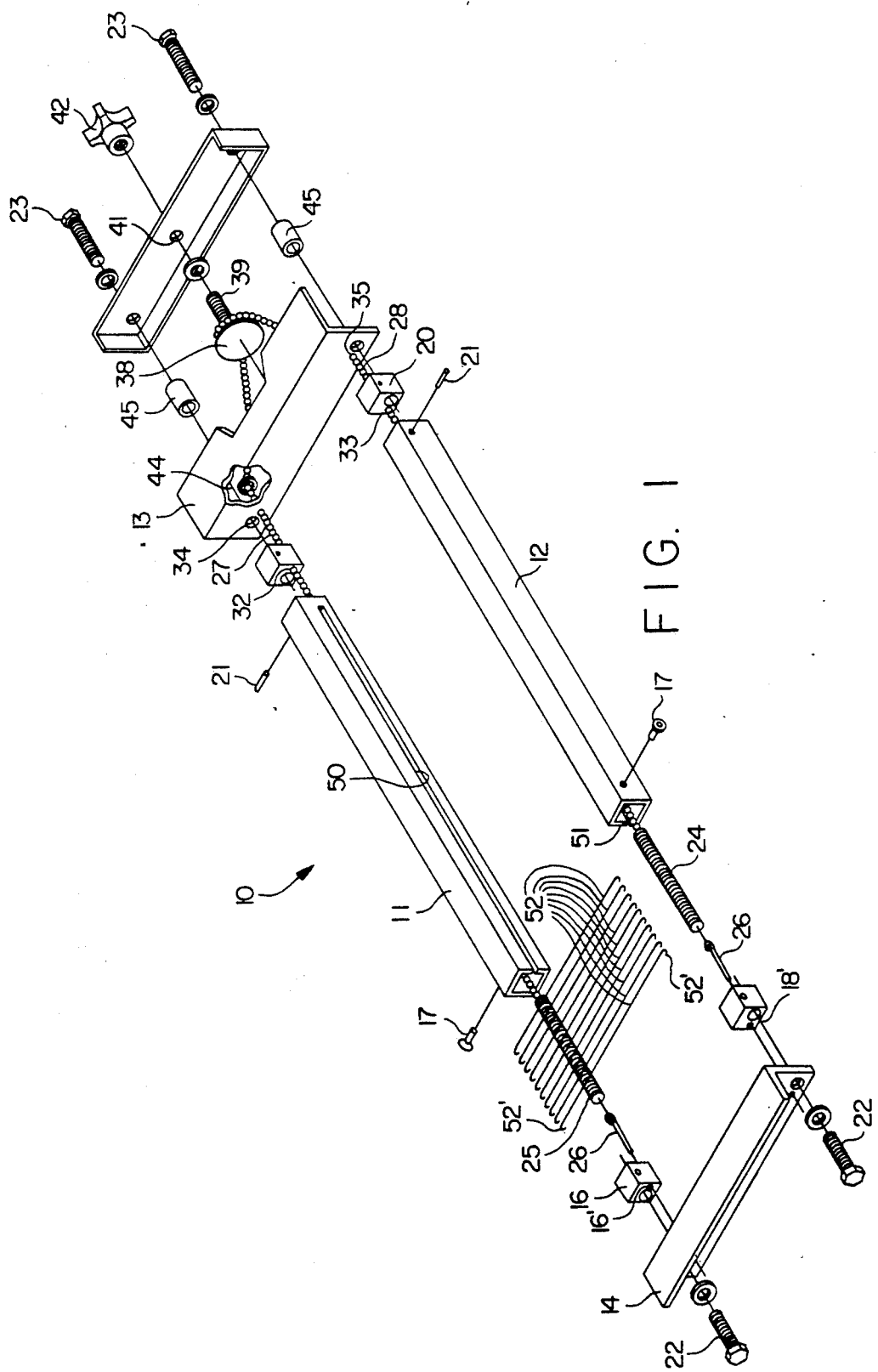
FIG. 1 is an exploded perspective view of the clay cutter.
Figure 4:
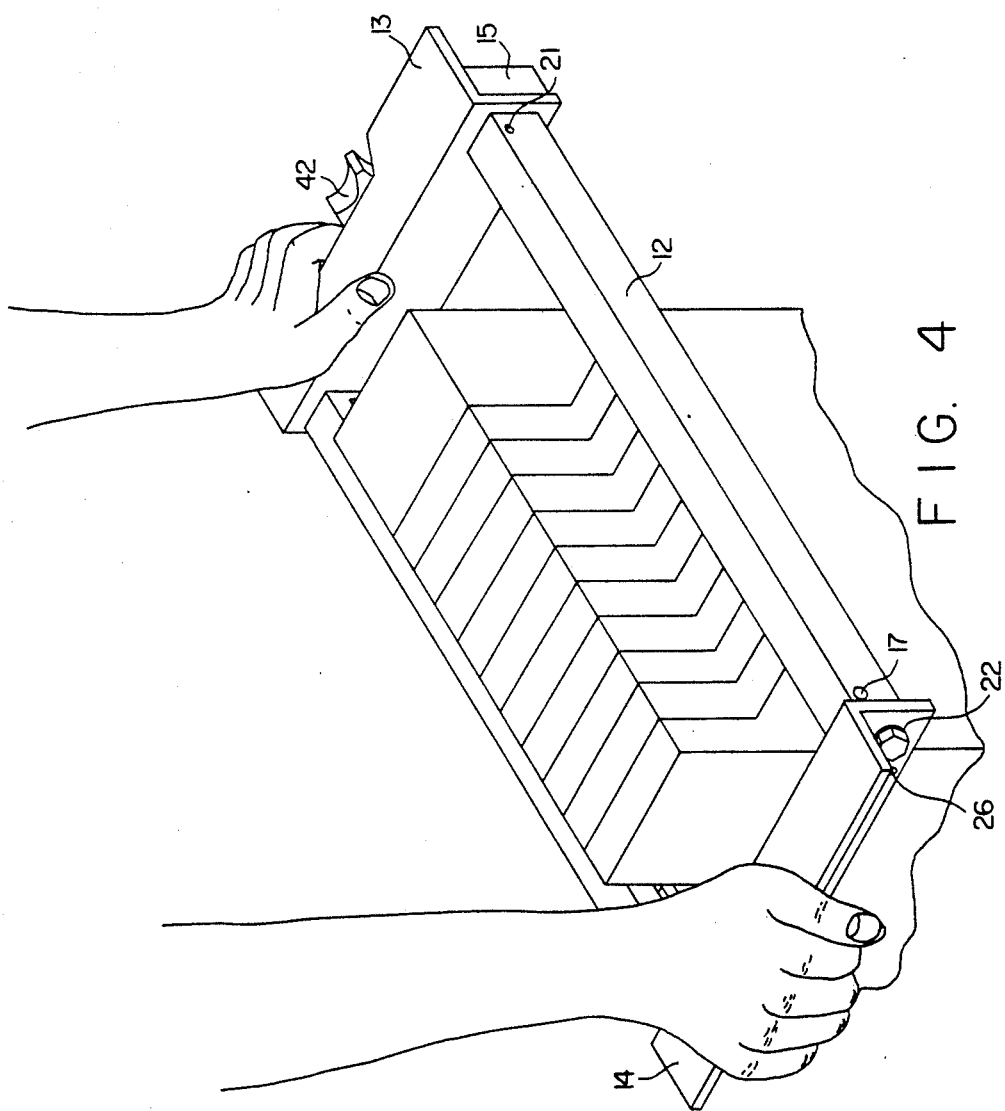
FIG. 4 is a perspective view showing the clay cutter in use.

Referring now specifically to the drawings, a clay cutter according to the present invention is illustrated in FIG. 1 and shown generally at reference numeral 10. Clay cutter 10 is formed of a rectangular assembly having two opposing and parallel side members 11 and 12, and two end members 13 and 14. End members are constructed of metal angle members. The horizontal surface of the end members 13, 14 serve as handles, as is shown in FIG. 4.

The assembly is fastened together by means of end plugs 16 and 18 fitted into one end of and secured to the tubular side members 11 and 12 by respective screws 17, and by end plugs 19 and 20 fitted into the other end of the tubular side members 11 and 12 and secured by respective roll pins 21. Threaded bolts 22 connect together end member 14 and the side members 11 and 12, and bolts 23 connect together cover 15 end member 13 and side members 11 and 12.

Figure 2:
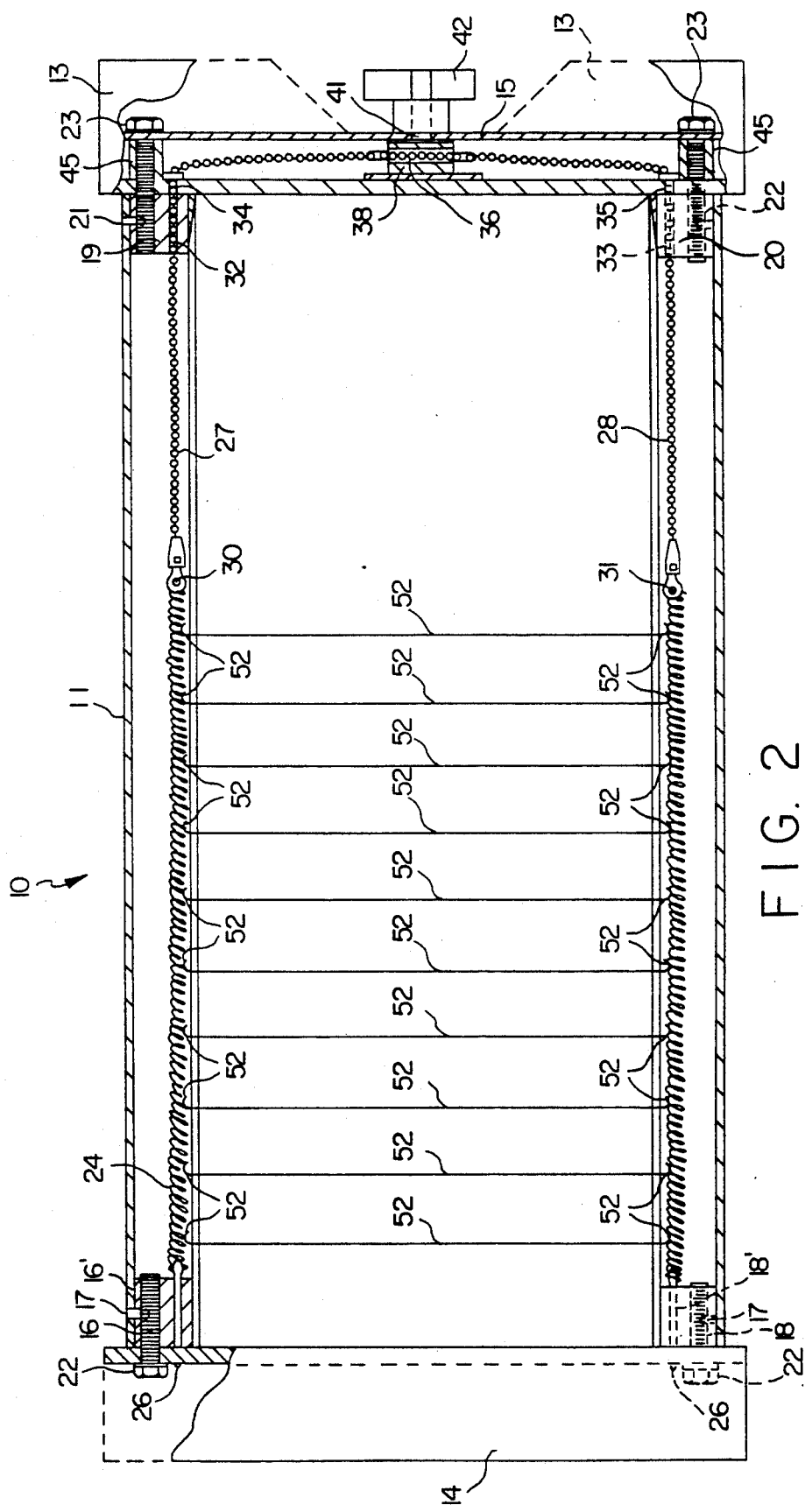
FIG. 2 is a top plan view with parts broken away of the clay cutter.

As is best shown in FIG. 2, helical coil springs 24 and 25 are positioned inside respective tubular side members 11 and 12 and are secured by one end to end plugs 16 and 18 with cotter pins 26. Cotter pins 26 are hooked through the one end of springs 24 and 25, and then extended through holes 16', 18' in end plugs 16, 18. The ends of the cotter pins 26 are then bent outwardly against the end plugs 16, 18 to hold the spring in position. In the preferred embodiment described in this application the helical springs 24, 25 are fabricated of 0.030" diameter wire. The springs 24, 25 are approximately ⅜ inch in diameter and 4 inches long when relaxed, and each have 111 coils. Of course, many other sizes of spring are usable depending on the particular characteristics desired of the clay cutter.

As is also shown in FIG. 2, the other end of springs 24 and 25 are connected to respective lengths of stainless steel ball chain 27 and 28 by means of connecting clips 30, 31. Ball chains 27 and 28 are each extended through bores 32, 33 in respective end plugs 19, 20, and through corresponding holes 34, 35 in end member 13. A low-friction radiused bushing 44 is secured around holes 34, 35 to ease passage of chain 27, 28 during operation.

The free end of ball chains 27, 28 are each passed through a hole 36 in a rotatable take-up shaft 38 and thus wound in opposite directions as shaft 38 is rotated. A slight compression of a hard rubber or other washer between a step in shaft 38 and cover 15 provides sufficient friction to prevent inadvertent unwinding.

Shaft 38 is mounted in a hole 41 in cover 15. A knob 42 screwed onto the end of shaft 38 permits shaft 38 to be easily turned. A formed cover 15 encloses the winding mechanism.

Figure 3:
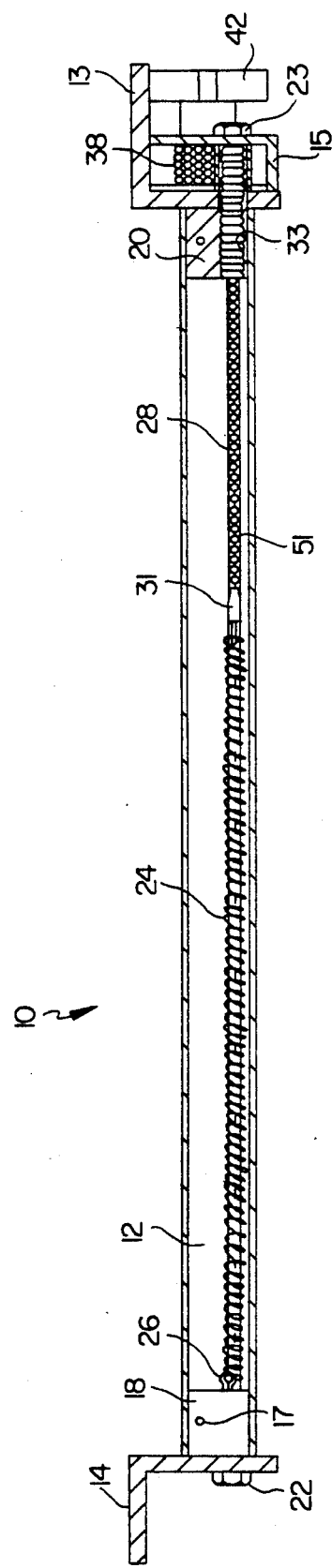
FIG. 3 is a cross-section of the clay cutter.

Screws 23 secure cover 15 and end member 13 to tubes 11 and 12 via threaded holes in end plugs 19 and 20. Spacers 45 prevent excessive compression of cover 15. See FIGS. 2 and 3.

As is best seen in FIG. 1, tubular side members 11 and 12 are provided with respective slots 50, 51 which extend almost the entire length of side members 11 and 12. Slots 50, 51 are substantially narrower than the diameter of springs 25 and 26 so that springs 25 and 26 cannot be pulled through slots 50, 51.

As is best seen in FIG. 2, cross wires 52 are positioned in the space between side members 11 and 12. Cross wires 52 are formed of 0.030" diameter pre-straightened spring wire. Opposing ends of cross wires 52 are bent into U-shaped hooks 52'. These hooks 52' are inserted into opposing slots 50, 51 and are hooked over respective coils of springs 24 and 25. B counting the coils of the springs 24 and 25 and spacing the opposing hooks of a single cross wire 52 on the same number coil on each spring 24 and 25, and spacing all of the wires 52 the same number of coils apart, the cross wires will be parallel to each other and the end members 13, 14 and perpendicular to the side members 11 and 12.

Operation of Clay Cutter

Generally, the coils of 24, 25 are springs fabricated to be of uniform construction along their entire length and will elongate and retract uniformly along their entire length. Utilizing this principle, turning knob 42 in one direction winds ball chains 27 and 28 onto shaft 38. Ball Chains 27 and 28 pull respective springs 25 and 24, elongating them uniformly along their length. Cross wires 52, each being the same number of coils apart, each separate from each other uniformly, and equally, as well. Thus, if the cross wires 52 start out ½ inch apart from each other and springs 24, 25 are elongated to the point where any two cross wires 52 are 1 inch apart, then all of the cross wires are 1 inch apart. Of course, if desired, slabs of differing thicknesses can be cut at the same time by spacing the cross wires 52 the desired differing distances apart initially. Adjustment of the cross wire spacing would result in slabs which are of lesser or greater thickness, but still having the same proportional thickness relative to each other.

As is shown in FIG. 4, clay cutter 10 is placed over an extrusion of green clay and firmly pressed directly downwardly. Cross wires 52 cut into the clay, slicing the clay into equally sized slabs.

A clay cutter is described above. Various details of the invention may be changed without departing from its scope. Furthermore, the foregoing description of the preferred embodiment of the invention and the best mode for practicing the invention are provided for the purpose of illustration only and not for the purpose of limitation—the invention being defined by the claims.

I claim:

1. A clay cutter for simultaneously cutting a plurality of slabs of clay, comprising:
   (a) frame means including first and second opposing, longitudinally-extending side members;
   (b) a plurality of separate, pre-straightened cross wires attached to and extending between said first and second side members in mutual parallel relation to each other; and
   (c) first and second extension means extending along respective ones of said side members and alternately retractable and uniformly extensible between a relatively short length and a relatively long length, said cross wires attached by opposite ends thereof to said extension means and moveable with said extension means as said extension means moves between said relatively short length and said relatively long length to thereby decrease or increase the space between each of said cross wires to maintain the same relative spacing between the cross wires as the extension means are moved and to thereby permit a plurality of slabs of clay to be cut during a single pass of the cross wires through a large mass of clay.

2. A clay cutter according to claim 1, and including locking means for locking the extension means and the cross wires in a fixed position.

3. A clay cutter according to claim 1, wherein said first and second extension means each comprise coil a spring unsupported along its length from one end of the frame means to the other.

4. A clay cutter according to claim 3, wherein said cross wires have integrally-formed hooks on opposing ends for hooking over a predetermined coil of said coil spring.

5. A clay cutter according to claim 3, and including strand means attached to said first and second extension mean for extending said coil springs against the bias of the springs.

6. A clay cutter according to claim 5, and including winding means for winding said strand means onto and off thereof as said coil spring is alternately extended and retracted.

7. A clay cutter according to claim 6, wherein said strand means a comprises a ball chain.

8. A clay cutter according to claim 6, wherein:
(a) said winding means comprises a single rotatable shaft;
(b) said strand means comprise first and second strands, each attached by one end thereof to one end of respective ones of said first and second coil springs; and
(c) the other end of each of said strands is attached to said shaft for simultaneous winding onto and off of said shaft as said coil spring is alternately extended and retracted.

9. A clay cutter according to claim 3, wherein:
(a) the side members are tubular and include inwardly-facing elongate slots in respective side walls of said side members, said elongate slots extending along the side members transverse to the direction of cutting;
(b) one of said coil springs is positioned for retraction and extension in respective ones of said slots; and
(c) opposing ends of said cross wires extend through said slots into attachment with said coil springs.

* * * * *